(12) United States Patent
Coleman et al.

(10) Patent No.: US 11,960,263 B2
(45) Date of Patent: Apr. 16, 2024

(54) BUILDING AUTOMATION SYSTEM MONITORING

(71) Applicant: Honeywell International Inc., Morris Plains, NJ (US)

(72) Inventors: Ben Coleman, Minneapolis (AU); Liana Maria Kiff, Minneapolis, MN (US); Christopher Goh, Chanhassen, MN (US); Mayur S. Salgar, Bangalore (IN); Manu Taranath, Bangalore (IN); Prabhat Ranjan, Bangalore (IN); Aaron Francis D'Souza, Bangalore (IN); Henrik Dibowski, Leipzig (CZ); Boon Toh, Sydney (AU)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 4 days.

(21) Appl. No.: 16/507,341

(22) Filed: Jul. 10, 2019

(65) Prior Publication Data

US 2021/0011448 A1 Jan. 14, 2021

(51) Int. Cl.
  *G05B 19/042* (2006.01)
  *G06Q 10/20* (2023.01)
  *G06Q 30/0283* (2023.01)

(52) U.S. Cl.
  CPC ......... *G05B 19/0428* (2013.01); *G06Q 10/20* (2013.01); *G06Q 30/0283* (2013.01)

(58) Field of Classification Search
  CPC . G06Q 10/20; G06Q 30/0283; G05B 19/0428
  See application file for complete search history.

(56) References Cited

U.S. PATENT DOCUMENTS

| | | | |
|---|---|---|---|
| 5,970,482 A | 10/1999 | Pham et al. | |
| 8,626,699 B2 | 1/2014 | Xie et al. | |
| 8,949,170 B2 | 2/2015 | Zadeh | |
| 10,242,091 B2 * | 3/2019 | Fliri et al. | |
| 10,437,581 B1 * | 10/2019 | Patil | H04L 67/12 |
| 10,607,475 B1 * | 3/2020 | Smith | H04W 76/19 |
| 2009/0105846 A1 * | 4/2009 | Hesse | G05B 15/02 700/1 |
| 2012/0296482 A1 * | 11/2012 | Steven | G05B 13/04 700/291 |
| 2016/0261465 A1 * | 9/2016 | Gupta | H04L 41/14 |
| 2017/0257645 A1 * | 9/2017 | Thiagarajan | G10L 19/00 |
| 2017/0284691 A1 * | 10/2017 | Sinha | F24F 11/62 |
| 2018/0173184 A1 * | 6/2018 | Kienzle | G05B 19/042 |
| 2019/0094827 A1 * | 3/2019 | Park | G05B 15/02 |
| 2019/0339687 A1 * | 11/2019 | Cella | G05B 19/41845 |
| 2020/0341459 A1 * | 10/2020 | Lin | G05B 19/4184 |

OTHER PUBLICATIONS

Michael John Sebastian Smith, Application Specific Integrated Circuits, 2010, ACADEMIA, 1-236 (Year: 2010).*

* cited by examiner

*Primary Examiner* — Robert E Fennema
*Assistant Examiner* — Yvonne Trang Follansbee
(74) *Attorney, Agent, or Firm* — Seager, Tufte & Wickhem, LLP

(57) ABSTRACT

A system for monitoring a building automation system (BAS). The systems may include a device to report data, a memory having an application that requires that the data from the device be reported at least at a minimum frequency, and a controller to receive the data from the device at least at the minimum frequency and use the application and the data to determine an operational status of a component of the BAS.

20 Claims, 9 Drawing Sheets

```
tempro:cdt_ti_ZoneTemperature_Role
    a honcore:PropertyRole ;
    honcore : isApplicableTo Honhvac : Airconditioner ;
    honcore : isApplicableTo Honhvac : Aircurtain ;
    honcore : isApplicableTo Honhvac : AirHandlingUnit ;
    honcore : isApplicableTo Honhvac : CeilingSuspendedUnit ;
    honcore : isApplicableTo Honhvac : ChilledBeamSystem ;
    honcore : isApplicableTo Honhvac : CrackUnit ;
    honcore : isApplicableTo Honhvac : Evaporator ;
    honcore : isApplicableTo Honhvac : FanCoilUnit ;
    honcore : isApplicableTo Honhvac : Heater ;
    honcore : isApplicableTo Honhvac : RoofTopUnit ;
    honcore : isApplicableTo Honhvac : SplitUnit ;
    honcore : isApplicableTo Honhvac : VariableAirVolume ;
    honcore : isApplicableTo Honhvac : VentilationSystem ;
    honcorepr : hasControlPointFunctionType ;
    honcorepr : PresentValue_ControlPointFunction :
    honcorepr : hasDistributionLocationType honhvacpr : ServicedSpace_Location ;
    honcorepr : hasMaterialType honcorepr : Air ;
    honcorepr : hasMeasureType honcorepr : Temperature ;
    honcorepr : hasSignalType honcorepr : Analog ;
    honcorepr : hasNaturalFrequency honcorepr : QuareterHour ;
    honpuc : isRoleForTemplateItem honentctmpl : cdt_ti_ZoneTemperature ;
    rdfs : label "Zone Temperature" ;
```

BUILDING AUTOMATION SYSTEM MONITORING

TECHNICAL FIELD

The disclosure relates generally to building automation systems, and more particularly to monitoring the performance of components of building automation systems.

BACKGROUND

Building automation systems (BAS) often include subsystems of a building, such as a Heating, Ventilation and/or Air Conditioning (HVAC) system, a security system, a lighting system, a fire system and/or other systems of a building. Cloud computing provides a substantial amount of computing power and data storage to run numerous performance algorithms. Currently, cloud computing is used to evaluate if various building subsystems are still performing at optimal conditions as they did when they were installed and commissioned. Cloud computing also provides the power for more sophisticated fault detection, diagnostics and analytics. In essence, it expands the potential for facility operators to use their BAS to optimize building systems, saving time and money on building operations maintenance. However, millions of existing buildings have low capacity devices and/or low bandwidth devices, and the manual process of adjusting the data acquisition configuration for such devices is error prone, costly and slow. Moreover, there is currently no intuitive way for BAS facility operators and BAS service/sales agencies to know who is operating in the BAS marketplace. What would be desirable is a mechanism that automatically adjusts devices for application data requests as they occur but with minimal amount of pre-configuration work to provide adequate data acquisition capability and that also provides detailed marketplace data to individuals employed/operating in the BAS field.

SUMMARY

In an example of the disclosure, a system for monitoring a building automation system (BAS) may comprise a device of the BAS configured to report data, a memory having an application stored thereon, wherein the application requires that the data from the device to be reported at least at a minimum frequency, and a controller operatively coupled to the device and the memory and configured to receive the data from the device at least at the minimum frequency in accordance with the application and use the application and the data to determine an operational status of a component of the BAS.

Alternatively or additionally to the foregoing, the controller may be further configured to identify a natural frequency that the device reports the data and compare the natural frequency that the device reports the data to the minimum frequency that the application requires that the data be reported from the device.

Alternatively or additionally to any of the embodiments above, the controller may be further configured to identify that the natural frequency that the device reports the data is different from the minimum frequency that the application requires that the data be reported from the device based on the comparison, and change the natural frequency to at least the minimum frequency that the application requires that the data be reported from the device in response to the identification that the natural frequency is different from the minimum frequency that the application requires that the data be reported from the device.

Alternatively or additionally to any of the embodiments above, the natural frequency may be obtained from a data structure for the BAS.

Alternatively or additionally to any of the embodiments above, the operational status of the component may indicate that the component needs repair, and in response the controller may be further configured to identify an agency that can repair or replace the component and send information about the agency and an estimate cost for repairing or replacing the component to a technician associated with the BAS.

Alternatively or additionally to any of the embodiments above, the operational status of the component and an identification of a building where the BAS is located may be sent to an agency that is associated with components similar to the component.

Alternatively or additionally to any of the embodiments above, the controller may be further configured to standardize the data from the device to determine the operational status of the component of the BAS.

In another example of the disclosure, a device for monitoring a BAS may be configured to access an application from a memory operatively coupled to the device, identify a minimum frequency that the application must receive data, receive data from the BAS at least at the minimum frequency, standardize the data, and determine an operational status of a component of the BAS using the application and the standardized data.

Alternatively or additionally to any of the embodiments above, the device may be further configured to identify a natural frequency that the BAS reports the data, and compare the natural frequency that the BAS reports the data to the minimum frequency that the application must receive the data.

Alternatively or additionally to any of the embodiments above, the device may be further configured to identify that the natural frequency that the BAS reports the data is different from the minimum frequency that the application must receive the data based on the comparison, and change the natural frequency to at least the minimum frequency that the application must receive the data in response to the identification that the natural frequency is different from the minimum frequency that the application must receive the data.

Alternatively or additionally to any of the embodiments above, the natural frequency may be obtained from a data structure for the BAS.

Alternatively or additionally to any of the embodiments above, the operational status of the component may indicate that the component needs repair and in response the device may be further configured to identify an agency that can repair or replace the component and send information about the agency and an estimate cost for repairing or replacing the component to a technician associated with the BAS.

Alternatively or additionally to any of the embodiments above, the operational status of the component and an identification of a building where the BAS is located may be sent to an agency that is associated with components similar to the component.

In another example of the disclosure, a method for monitoring a BAS may comprise accessing an application from memory operatively coupled to the BAS, identifying a minimum frequency that the application must receive data, receiving data from the BAS at least at the minimum frequency, and determining an operational status of a component of the BAS using the application and the data.

Alternatively or additionally to any of the embodiments above, the method may further comprise identifying a natural frequency that the BAS reports the data, and comparing the natural frequency that the BAS reports the data to the minimum frequency that the application requires that the data must be received.

Alternatively or additionally to any of the embodiments above, the method may further comprise identifying that the natural frequency that the BAS reports the data is different from the minimum frequency that the application must receive the data based on the comparison, and changing the natural frequency to at least the minimum frequency that the application must receive the data in response to the identification that the natural frequency is different from the minimum frequency that the application must receive the data.

Alternatively or additionally to any of the embodiments above, the natural frequency may be obtained from a data structure for the BAS.

Alternatively or additionally to any of the embodiments above, the operational status of the component may indicate that the component needs repair and in response the method may further comprise identifying an agency that can repair or replace the component, and sending information about the agency and an estimate cost for repairing or replacing the component to a technician associated with the BAS.

Alternatively or additionally to any of the embodiments above, the operational status of the component and an identification of a building where the BAS is located may be sent to an agency that is associated with components similar to the component.

Alternatively or additionally to any of the embodiments above, the method may further comprise standardizing the data to determine the operational status of the component of the BAS.

The above summary of some illustrative embodiments is not intended to describe each disclosed embodiment or every implementation of the present disclosure. The Figures and Description which follow more particularly exemplify these and other illustrative embodiments.

BRIEF DESCRIPTION OF THE FIGURES

The disclosure may be more completely understood in consideration of the following description in connection with the accompanying drawings, in which:

FIGS. 5-6 are illustrative data structures;

Figure 1:
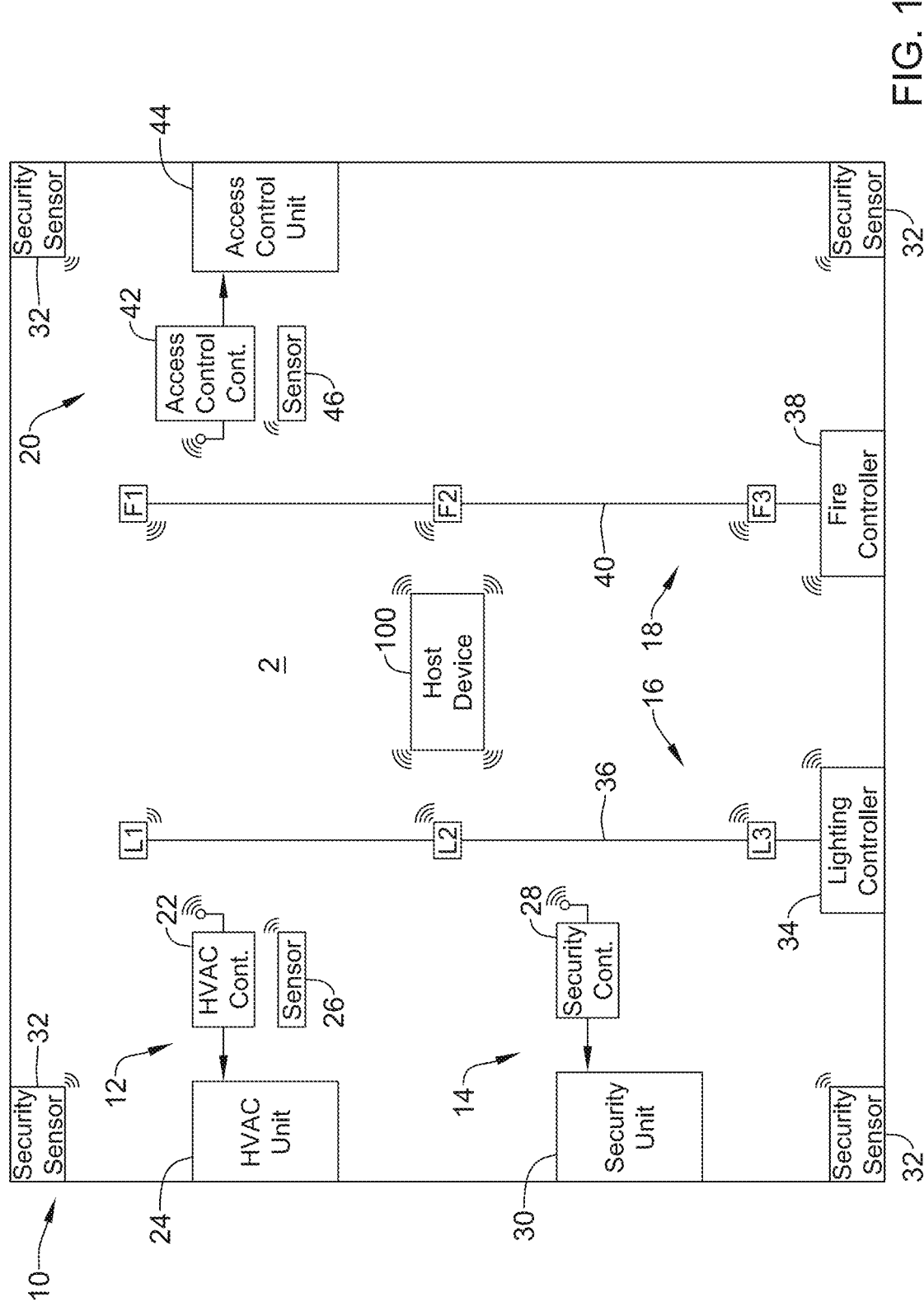
FIG. 1 is a schematic of a structure that includes a building automation system (BAS)

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions should be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used in connection with other embodiments whether or not explicitly described unless clearly stated to the contrary.

The following description should be read with reference to the drawings in which similar structures in different drawings are numbered the same. The drawings, which are not necessarily to scale, depict illustrative embodiments and are not intended to limit the scope of the disclosure. Although examples of construction, dimensions, and materials may be illustrated for the various elements, those skilled in the art will recognize that many of the examples provided have suitable alternatives that may be utilized.

The current disclosure relates to devices, controllers, systems, computer programs, and methods adapted for monitoring components of a building automation system (BAS). In some cases, "characteristic" data (e.g., heating, ventilation, and air conditioning (HVAC) system data, security system data, lighting system data, fire system data, access control system data. status data, calculated data, set point data, identification data, weather data, sensor data, image data, etc.) may be associated with the components of the BAS. In some instances, the characteristic data may be used to generate operation models for the components. In some cases, the operation models may be component fault or failure predictors that may be capable of forecasting deterioration or constraints of the components over time and predict their operating and structural conditions/limitations that may cause the components to fail.

FIG. 1 is a schematic view of a building or structure 10 that includes an illustrative building automation system (BAS) 2 for controlling one or more client devices servicing the building or structure 10. The BAS 2, as described herein according to the various illustrative embodiments, may be used to control environmental conditions, lighting conditions, security settings, fire/smoke monitoring, and/or access settings in buildings such as, for example, retail stores, commercial offices, hospitals, clinics, restaurants, single family dwellings, hotels, multi-tenant buildings, and/or multi-use facilities. These are just some examples. It will be generally understood that the BAS 2 may be expanded and adapted to control and manage other systems and building control components, and may be deployed on a larger scale as the need arises. In addition, the BAS 2, as described herein, may provide a wireless retrofit solution for facilities employing older building control components that may be wired and that are currently incapable of receiving a wireless or digital command signal. For example, the BAS 2 may be configured to coordinate operational control of multiple building control components servicing the building or structure 10, that otherwise operate independently of one another. This may increase operational efficiency, reduce operational costs and/or maximize energy efficiency of the building or structure 10 in which the BAS 2 is deployed.

The illustrative BAS 2 shown in FIG. 1 includes one or more heating, ventilation, and air condition (HVAC) systems 12, one or more security systems 14, one or more lighting systems 16, one or more fire systems 18, and one or more access control systems 20. In some cases, each system may include a client device configured to provide one or more control signals for controlling one or more building control components of the BAS 2. For instance, in some cases, the HVAC system 12 may include an HVAC control device 22 used to communicate with and control one or more HVAC units 24 for servicing the building or structure 10. In some cases, the security system 14 may include a security control device 28 used to communicate with and control one or more security units 30 for monitoring the building or structure 10. In some cases, the lighting system 16 may include a lighting control device 34 used to communicate with and control one or more light banks 36 having lighting units L1, L2, and L3 for servicing the building or structure 10. In some cases, the fire system 18 may include a fire control device 38 used to communicate with and control one or more fire banks 40 having fire units F1, F2, and F3 for monitoring and servicing the building or structure 10. In some cases, the access control system may include an access control device 42 used to communicate with and control one or more access control units 44 for allowing access in, out, and/or around the building or structure 10.

In a simplified example, the BAS 2 may be used to control a single HVAC system 12, a single security system 14, a single lighting system 16, a single fire system 18, and/or a single access control system 20. In other embodiments, the BAS 2 may be used to communicate with and control multiple discrete building control devices 22, 28, 34, 38, and 42 of multiple systems 12, 14, 16, 18 and 20. The control devices 22, 28, 34, 38, and 42 may be located in different zones or rooms of the building and may be mounted, for example, on a wall, ceiling, or window of the building or structure 10. In some cases, the systems 12, 14, 16, 18, and 20 may be powered by line voltage, and may be powered by the same or different electrical circuit. While FIG. 1 shows control devices 22, 28, 42 controlling three units 24, 30, 44, a lighting control device 34 for controlling lighting bank 36 having three lighting units L1, L2, and L3, and a fire control device 38 for controlling fire bank 40 having three fire units F1, F2, and F3, it is contemplated that the BAS 2 may be used to control other suitable building control components that may be used to service the building or structure 10.

According to various embodiments, the BAS 2 may include a host device 100 that may be configured to communicate with the discrete systems 12, 14, 16, 18, and 20 of the building automation system 2 and provide one or more control signals for controlling the building automation system 2. In some cases, the host device 100 may be configured with an application program that configures the clients (i.e., control devices 22, 28, 34, 38, and 42) to establish communication between the host and the clients. In some cases, there may be multiple hosts. For instance, in some examples, the host device 100 may be one or many of the control devices 22, 28, 34, 38, and 42.

Additionally, once communication is established, the host device 100 may be configured to control the systems 12, 14, 16, 18, and 20 in one or more rooms and/or zones of the building or structure by activating and/or deactivating the building control devices 22, 28, 34, 38, and 42 to operate the systems in a controlled manner. In some cases, the host device 100 may be configured to transmit a command over a wired or wireless network to one or more of the control devices 22, 28, 34, 38, and 42. In some cases, each control device may be located near or in close proximity to the building control components that it controls. The building control devices 22, 28, 34, 38, and 42 may be configured to transmit a command signal to its corresponding building control component(s) for activating or deactivating the building control component(s) in a desired manner.

In some instances, the building control devices 22, 28, and 42 may be configured to receive signals from one or more sensors 26, 32, and 46 located throughout the building or structure 10. In some cases, the building control devices 34 and 38 may be configured to receive signals from one or more sensors operatively and/or communicatively coupled with the lighting units L1, L2, and L3 and/or the fire units F1, F2, and F3 located throughout the building or structure 10. In some cases, the one or more sensors may be integrated with and form a part of one or more of their respective building control devices 22, 28, 34, 38, and 42. In other cases, one or more sensors may be provided as separate components from the corresponding building control device. In still other instances, some sensors may be separate components of their corresponding building control devices while others may be integrated with their corresponding building control device. These are just some examples. The building control devices 22, 28, 34, 38, 42 and a host device 100 may be configured to use signal(s) received from the one or more sensors to operate or coordinate operation of the various building automation systems 12, 14, 16, 18, and 20 located throughout the building or structure 10.

The one or more sensors 26, 32, 46, L1-L3, and F1-F3 may be any one of a temperature sensor, a humidity sensor, an occupancy sensor, a light sensor, a current sensor, smoke sensor and/or any other suitable sensor. In one example, at least one of the sensors 26, 32, 46, or L1-L3 may be an occupancy sensor. The building control devices 22, 28, 34, 42 and/or the host device 100 may receive a signal from the occupancy sensor indicative of occupancy within a room or zone of the building or structure 10. In response, the building control devices 22, 28, 34, 42 and/or the host device 100 may send a command to activate one or more building control component(s) located in or servicing the room or zone where occupancy is sensed.

Likewise, in some cases, at least one of the sensors 26 may be a temperature sensor configured to send a signal indicative of the current temperature in a room or zone of the building or structure 10. The building control device 22 and/or the host device 100 may receive the signal indicative of the current temperature from the temperature sensor 26. In response, the building control device 22 and/or the host device 100 may send a command to HVAC unit 24 to activate and/or deactivate the HVAC 24 that is in or is servicing that room or zone to regulate the temperature in accordance with a desired temperature set point.

In yet another example, one or more of the sensors may be a current sensor. The current sensor may be coupled to the one or more building control components and/or an electrical circuit providing electrical power to one or more building control components. The current sensors may be configured to send a signal to a corresponding building control device and/or the host device 100 that indicates an increase or decrease in electrical current associated with the operation of the building control component. This signal may be used to provide confirmation that a command transmitted by a building control device and/or the host device 100 has been successfully received and acted upon by the building control component(s).

These are just a few examples of the configuration of the building automation systems and the communication that can take place between the building automation systems and the host device 100. In other examples, the host device 100 may establish communication with other client devices not located in a building or structure and that perform a variety tasks in a coordinated manner.

In some cases, the host device 100 and/or the building control devices 22, 28, 34, 42 may collect characteristic data from the various building automation systems 12, 14, 16, 18, and 20 associated with components of the BAS 2. In some instances, the host device 100 and/or the building control devices 22, 28, 34, 42 may use the characteristic data to generate operation models for the components. In other cases, the host device 100 and/or the building control devices 22, 28, 34, 42 may send the characteristic data to devices external of the BAS 2, such as devices in a cloud computing environment, to generate operation models for the components.

It is understood in advance that although this disclosure includes a detailed description on cloud computing, an implementation of the teachings recited herein is not limited to a cloud computing environment. Rather, embodiments of the present system are capable of being implemented in conjunction with any other type of device or computing environment now known or later developed. Cloud computing may be a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Moreover, a cloud computing environment may be service oriented with a focus on statelessness, low coupling, modularity, and semantic interoperability. At the heart of cloud computing may be an infrastructure comprising a network of interconnected nodes.

Figure 2:
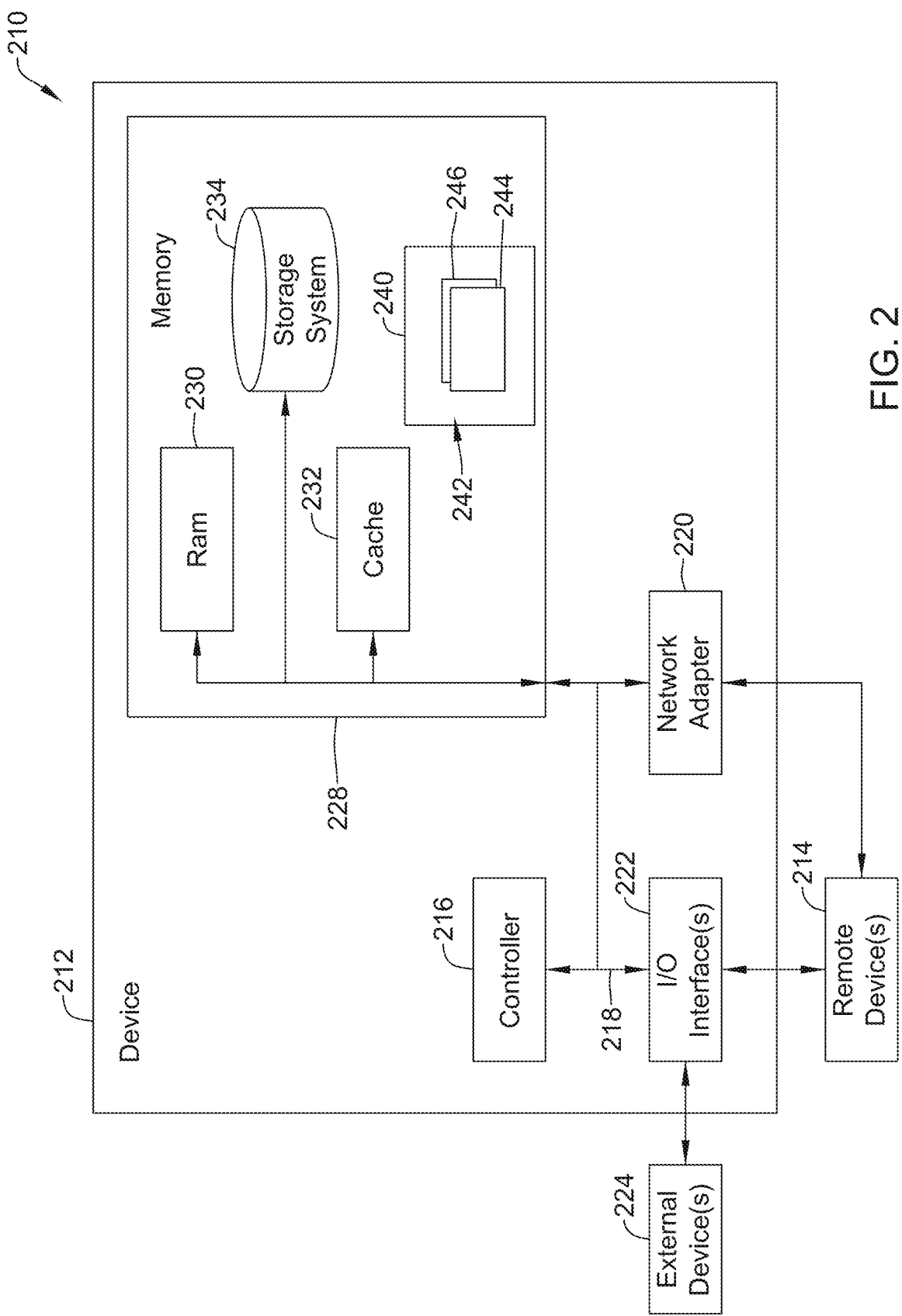
FIG. 2 is a schematic of an example of a cloud computing node.

FIG. 2 depicts a schematic of an example of a cloud computing node 210. The cloud computing node 210 is only one example of a suitable cloud computing node and is not intended to suggest any limitation as to the scope of use or functionality of embodiments described herein. Regardless, the cloud computing node 210 may be capable of being implemented and/or performing any of the functionalities set forth herein.

In the cloud computing node 210, there may be a device 212 for monitoring a BAS. In some cases, the device 212 may be a computer system/server that may be operational with numerous other general purpose or special purpose computing system environments or configurations. Examples of well-known computing systems, environments, and/or configurations that may be suitable for use with the device 212 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The device 212 may be described in the general context of computer system executable instructions, such as program modules, being executed by a computer system. Generally, program modules may include routines, programs, objects, components, logic, data structures, and so on, which perform particular tasks or implement particular abstract data types. The device 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, the device 212 in cloud computing node 210 is shown in the form of a general-purpose computing device. The components of the device 212 may include, but are not limited to, one or more processors or controllers 216, a system memory 228, and a bus 218 that couples various system components including system memory 228 to the controller 216.

The bus 218 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

In some instances, the controller 216 may include a pre-programmed chip, such as a very-large-scale integration (VLSI) chip and/or an application specific integrated circuit (ASIC). In such embodiments, the chip may be pre-programmed with control logic in order to control the operation of the device 212. In some cases, the pre-programmed chip may implement a state machine that performs the desired functions. By using a pre-programmed chip, the controller 216 may use less power than other programmable circuits (e.g., general purpose programmable microprocessors) while still being able to maintain basic functionality. In other instances, the controller 216 may include a programmable microprocessor. Such a programmable microprocessor may allow a user to modify the control logic of the device 212 even after it is installed in the field (e.g., firmware update), which may allow for greater flexibility of the device 212 in the field over using a pre-programmed ASIC.

The device 212 may include a variety of computer system readable media. Such media may be any available media that is accessible by the device 212, and it includes both volatile and non-volatile media, removable and non-removable media.

The memory 228 can include computer system readable media in the form of volatile memory, such as random access memory (RAM) 230 and/or cache memory 232. The device 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, EPROM, flash memory (e.g., NAND flash memory), an external SPI flash memory or other optical media can be provided. In such instances, each can be connected to the bus 218 by one or more data media interfaces. As will be further depicted and described below, memory 228 may include at least one program product having a set (e.g., at least one) of program modules (e.g., software) that are configured to carry out the functions of embodiments of the system.

Program/utility 240, having a set (e.g., at least one) of program modules 242, may be stored in memory 228 by way of example, and not limitation, as well as an operating system, one or more application programs (e.g., a Fault Detection and Prediction Application (FDP) 244 and a Commercial Real Estate Data Management Application (CREDM) 246), other program modules, and program data. Each of the operating system, one or more application programs, other program modules, and program data or some combination thereof, may include an implementation of a networking environment. Program modules 242 generally carry out the functions and/or methodologies of embodiments of the system as described herein. In some cases, the program modules 242 and/or the application programs (e.g., the FDP 244 and the CREDM 246) may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The device 212 may also communicate with one or more external devices 224 such as a keyboard, a pointing device, a display, etc.; one or more devices that enable a user to interact with the device 212; and/or any devices (e.g., network card, modem, etc.) that enable the device 212 to communicate with one or more other remote devices 214 such as, for example, a component of a BAS, a smart phone, tablet computer, laptop computer, personal computer, PDA, and/or the like. Such communication with the external device 224 can occur via Input/Output (I/O) interfaces 222. Still yet, the device 212 can communicate with the external devices 224 and/or the remote devices 214 over one or more networks such as a local area network (LAN), a general wide area network (WAN), and/or a public network (e.g., the Internet) via network adapter 220. As depicted, the I/O interfaces 222 and the network adapter 220 communicate with the other components of the device 212 via bus 218. In some cases, the remote devices 214 may provide a primary and/or a secondary user interface for the user to interact with the device 212. In some cases, the device 212 may utilize a wireless protocol to communicate with the remote devices 214 over the network.

In some instances, the FDP 244 and the CREDMN 246 may execute entirely on the device 212, as a stand-alone software package, and/or partly on the device 212 and partly on the remote devices 214. For example, the FDP 244 may provide instructions to the controller 216 to access characteristic data. In some examples, the characteristic data may also be stored locally on the device 212, partially on the device 212 and partially on an external computing architecture/environment, or fully on an external computing architecture/environment (e.g., a remote server). In some cases, the characteristic data may be associated with a component of a BAS or a room/zone located in a building or structure. For instance, the characteristic data may refer to information produced as result of environmental conditions inside and outside of the building. Additionally, the characteristic data may also refer to information produced as a result of actions by an HVAC system for the building. For example, the characteristic data may refer to the operation of the individual devices of the HVAC system. In another example, the characteristic data may refer to the composition and attributes of the air produced by the HVAC system. In yet further examples, the characteristic data may be a combination of environmental conditions and operation by the HVAC system. That is, the environmental conditions may affect and/or alter how the HVAC system operates. For instance, weather temperatures outside of the building may dictate the operation frequency of the air handling units (AHUs), the heaters, the air conditioners, the fan coil units (FCUs), the roof top units (RTUs), etc. of the HVAC system and the air quality produced by the HVAC system that is distributed throughout a zone of the building. In some cases, the characteristic data may track and record the operation of the HVAC system and the environmental conditions. The characteristic data may then be accessed using a range of devices connected to a network (e.g., the Internet), such as the device 212, a PC, tablet, smartphone, for example.

In some cases, the FDP 244/device 212 may configure the rate at which the characteristic data is reported/received. The characteristic data may then be standardized/normalized and grouped accordingly. For example, for the device 212 to perform correctly, the FDP 244 may require the characteristic data at a minimum frequency. Moreover, components of a BAS or conditions of a zone of a building may have "natural" frequency at which the characteristic data is reported/exported to the controller 216. In some cases, the natural frequency at which the characteristic data is reported may not be the same as the minimum frequency required by the FDP 244. For instance, in some cases, the natural frequency may be less than the minimum frequency. Accordingly, in this case, the FDP 244 may provide instructions to the controller 216 to increase the natural frequency at which the characteristic data is reported from the BAS to the minimum frequency required by the FDP 244. As such, the FDP 244 may perform correctly and only the necessary amount of communication bandwidth is used. Additionally, in some cases, the natural frequency may be more than the minimum frequency. In this case, although the FDP 244 receives the characteristic data at a frequency that meets its requirements, the transmission of the characteristic data may be consuming an excess of bandwidth. Accordingly, the FDP 244 may again provide instructions to the controller 216 to decrease the natural frequency at which the characteristic data is exported from the BAS to the minimum frequency required by the FDP 244. As such, the FDP 244 may perform correctly and only the necessary amount of communication bandwidth is used.

Additionally, once the characteristic data rate is configured, the FDP 244 may take distinct characteristic data for components of a BAS and/or a zone in a building, group the characteristic data into the correct datasets, and generate a set of asset models from the grouped data. The FDP 244 may then provide instructions to the controller 216 to use the set of asset models to create and generate operation models for the components of the BAS. In some cases, the operation models may be forecasters of when the components are likely to malfunction or decrease in operation. As such, the FDP 244 may provide instructions to the controller 216 to send a report of the predictive operation performance of the components to a technician/employee of the building where the BAS is located or an agency that repairs or replaces components of a BAS. This may allow the technician and/or the agency to determine a proper course of action to take regarding the components (e.g., to repair the components, to replace the components, and/or offer to repair or replace the components).

In some examples, the CREDMN 246 may also provide instructions to the controller 216 to access commercial real estate databases to obtain commercially available real estate data sets, such as existing pricing/value models of existing applications and other business intelligence (e.g., conversions and margins for previous projects related to building automation systems as defined by granular real estate data). In some examples, the real estate data may also be stored locally on the device 212, partially on the device 212 and partially on an external computing architecture/environment, or fully on an external computing architecture/environment (e.g., a remote server). In some cases, the FDP 244 may provide instructions to the controller 216 to use the real estate data to update the set of asset models and generate new operation models for the components of the BAS. In other words, the CREDMN 246 may provide data that helps purge, standardize, tag, categorize, and summarize the characteristic data properly so that the characteristic data may be used to generate operation models that more accurately predict whether there is a likelihood that components are likely to malfunction or decrease in operation. Accordingly, in some cases, the controller 216 may produce reliable, repeatable descriptive results and predictions and uncover "hidden insights" through historical relationships and trends in the characteristic data. As such, in some examples, the controller 216 may be configured to "learn" (e.g., progressively improve the failure prediction of the operation models) from the reports and/or feedback, without being explicitly programmed. For instance, the controller 216 may automatically update the operation models for the components of the BAS and produce a more accurate forecaster of when the components are likely to malfunction or decrease in operation and automatically identify sales opportunities and provide price/quote estimations that may then be reported to a technician/employee and/or an agency that repairs or replaces components of a BAS.

It should be understood that although not shown, other hardware and/or software components could be used in conjunction with the device 212. Examples, include, but are not limited to: microcode, device drivers, redundant processing units, external disk drive arrays, RAID systems, tape drives, and data archival storage systems, etc.

Figure 3:
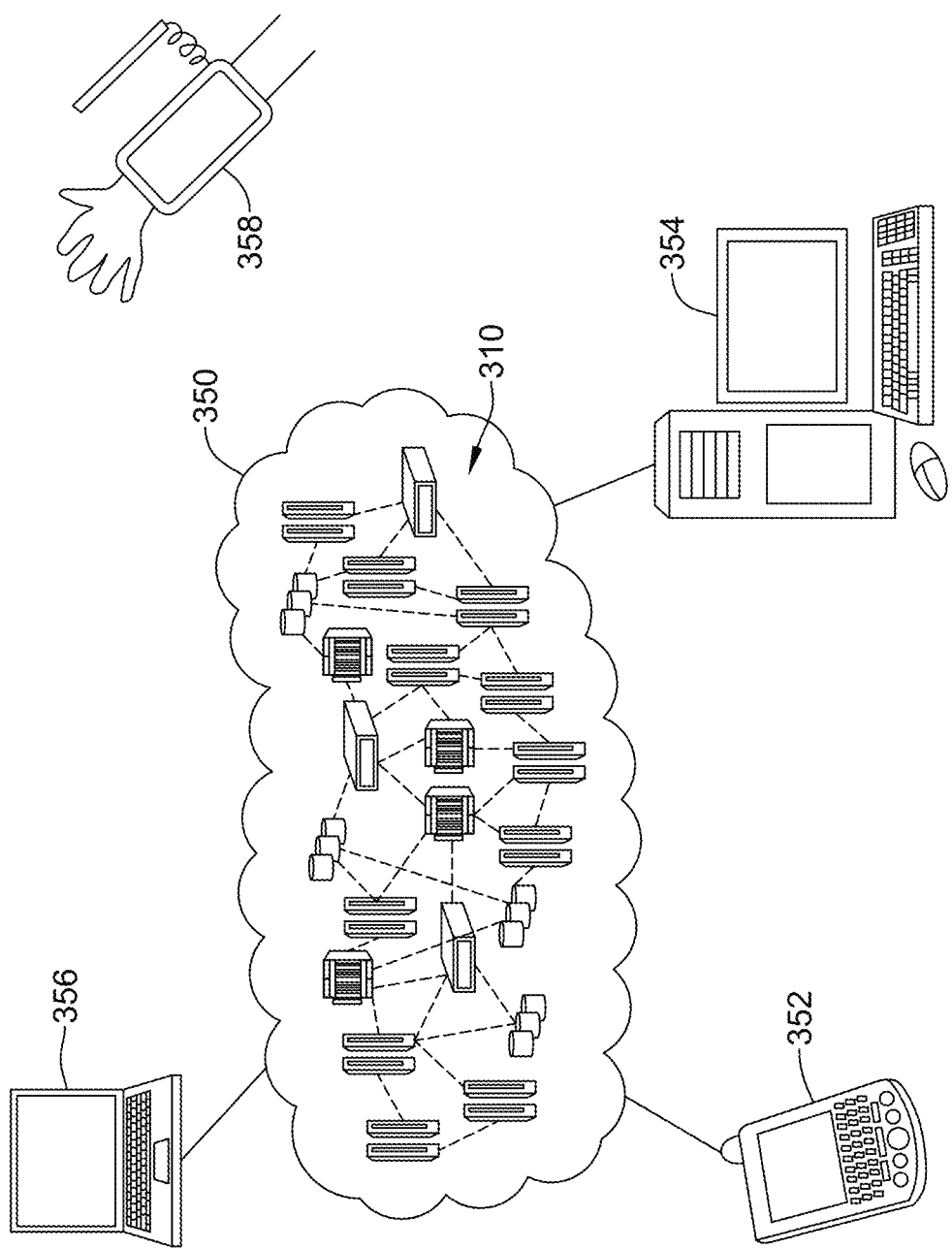
FIG. 3 is an illustrative cloud computing environment.

FIG. 3 depicts an illustrative cloud computing environment 350. As shown, cloud computing environment 350 comprises one or more cloud computing nodes 310 with which cloud consumers (e.g., utility companies, technicians, investigators, general public, etc.) may use local computing devices, such as, for example, a personal digital assistant (PDA) or a cellular telephone 352, desktop computer 354, laptop computer 356, and/or a field device 358 that may communicate. Nodes 310 may communicate with one another. They may be grouped (not shown) physically or virtually, in one or more networks, such as, for example, Private, Community, Public, or Hybrid clouds, or a combination thereof. This may allow cloud computing environment 350 to offer infrastructure, platforms and/or software (e.g., the FDP 244 or CREDM 246, from FIG. 2) as services for which a cloud consumer does not need to maintain resources on a local computing device. It is understood that the types of computing devices 352, 354, 356, 358 shown in FIG. 3 are intended to be illustrative only and that computing nodes 310 and cloud computing environment 350 can communicate with any type of computerized device over any type of network and/or network addressable connection (e.g., using a web browser).

Figure 4:
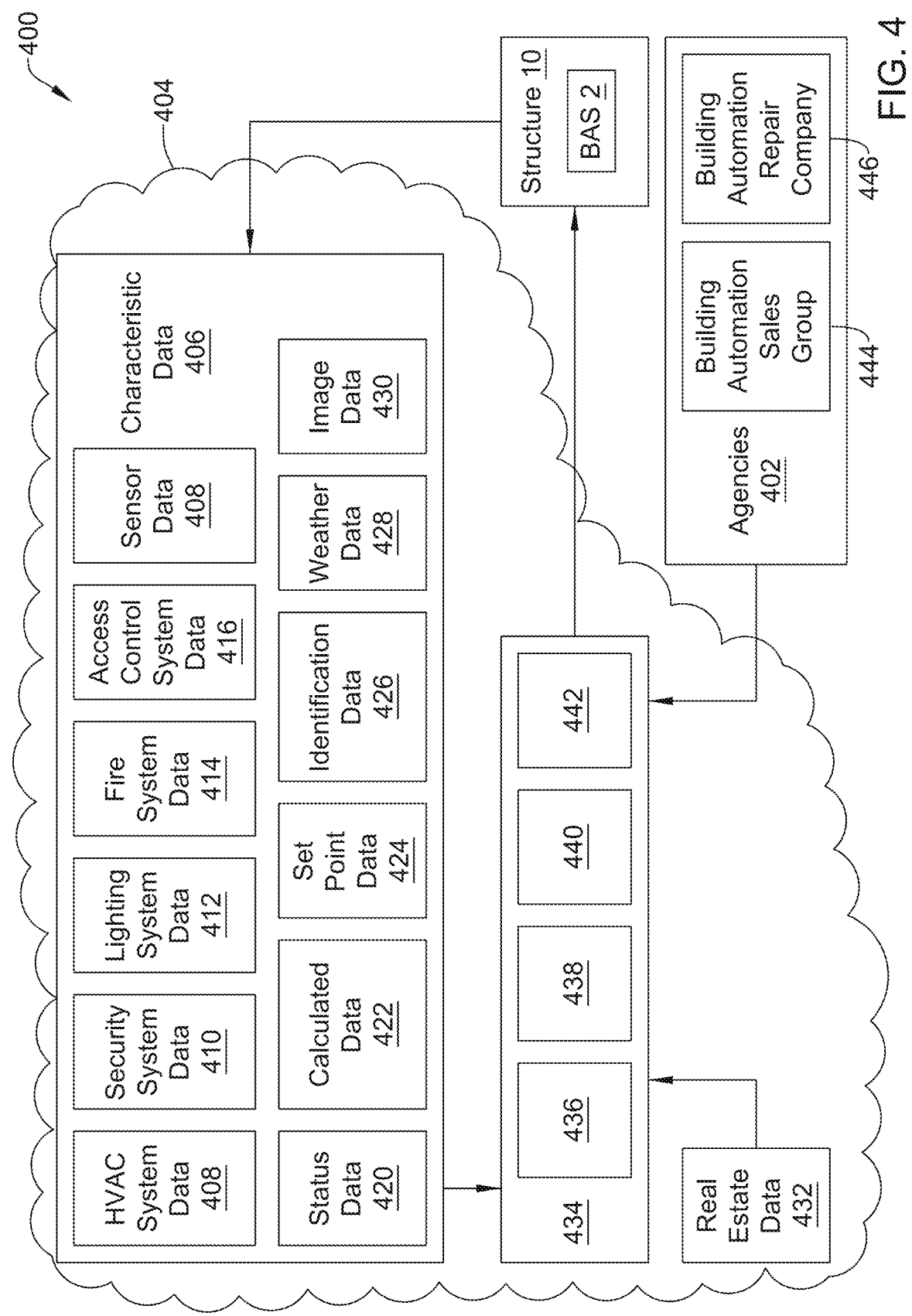
FIG. 4 is an illustrative system for monitoring a BAS.

FIG. 4 depicts an illustrative system 400 for monitoring the BAS 2. As shown in FIG. 4, the system 400 may include the structure 10, agencies 402, and a cloud computing environment 404 (e.g., a remote server(s)). As discussed above, the structure 10 may include the BAS 2. In some cases, a device, such as device 212, may be included in the BAS 2. In some cases, the device may be a remote server included with the cloud computing environment 404. In some cases, the BAS 2 may send characteristic data 406 to be stored in the cloud environment 404. In some cases, the characteristic data 406 may be associated with component(s) of the BAS 2 servicing a zone or room of the structure 10. For instance, as shown in FIG. 4, the characteristic data 406 may include HVAC system data 408, security system data 410, lighting system data 412, fire system data 414, access control system data 416, sensor data 418, status data 420, calculated data 422, set point data 424, identification data 426, weather data 428, and image data 430 for systems of the BAS 2. It is understood that the types of the characteristic data 406 shown in FIG. 4 are intended to be illustrative only and that the characteristic data 406 may include more or less data types and can include any type of data relevant to the BAS 2 or structure 10.

In some instances, a models layer 434 may track, validate, cleanse, process, and record the characteristic data 406 to generate operation models and reports. For example, the model Layers 434 may include a Component Energy Forecasting Module 436, a Component Deterioration Forecasting Module 438, a Building Prediction Module 440, and a Time to Event Prediction Module 442. It is understood that the modules of the models Layer 434 are intended to be illustrative only and that the models Layer 434 may include more or less modules and can include any type of relevant module. In some examples, the models layer 434 may identify the zones in the structure 10 where the components are located and segment or group the components according to their zones. The models layer 434 may then acquire the characteristic data from the data structures for each particular zone.

In some cases, for the models layer 434 to generate the operation models and reports, the modules (e.g., the Component Energy Forecasting Module 436, the Component Deterioration Forecasting Module 438, the Building Prediction Module 440, and the Time to Event Prediction Module 442) may require the characteristic data at a minimum frequency rate. Moreover, in some cases, different modules may require the characteristic data at different minimum frequency rates. In either case, the zones of the structure 10 or components of the BAS 2 may have "natural" frequencies rates at which the characteristic data is reported/exported. In some instances, the rate at which the characteristic data are reported to the models layer 434 may depend on the variable being monitored/controlled. For example, FIG. 5 depicts a temperature data structure 500 for a particular zone of the structure 10. As shown, the data structure 500 includes component tags for each component of the HVAC system associated with the zone (e.g., an AHU tag, a heater tag, an air conditioner tag, FCU tag, an RTU tag, etc.) and other control tags associated with the monitoring/controlling of the temperature of the zone. As can be seen, the data structure 500 includes a Natural Frequency Rate Tag 502. In this example, the Natural Frequency Rate Tag 502 is set at every quarter hour or 15 minutes. That is, the temperature of the zone (i.e., the characteristic data) is reported/exported to the models layer 434 every 15 minutes. However, in some cases, the modules of the models layer 434 may require that the temperature of the zone be reported at a rate other than every 15 minutes. For example, the Component Energy Forecasting Module 436 may require that the temperature is reported every 5 minutes, the Component Deterioration Forecasting Module 438 may require that the temperature is reported every 30 minutes, the Building Prediction Module 440 may require that the temperature is reported every hour, and the Time to Event Prediction Module 442 may require that the temperature is reported every minute. In this case, two modules require that the temperature is reported at minimum frequency that is less than the 15 minute rate and two modules require that the temperature is reported at minimum frequency that is greater than the 15 minute rate. Accordingly, in some instances, the models layer 434 may be configured to change the rate at which the temperature is reported based on the minimum frequency for each module. As such, in this examples, the models layer 434 may instruct the BAS 2 to report the temperature of the zone every 5 minutes for the Component Energy Forecasting Module 436, every 30 minutes for the Component Deterioration Forecasting Module 438, every hour for the Building Prediction Module 440, and every minute for the Time to Event Prediction Module 442. In this instance, each module may receive the temperature of the zone at the required rate in order to operate correctly. Moreover, the transmission of the temperature may only consume the necessary bandwidth for the modules to operate correctly. As such, the BAS monitoring system may be operating at its maximum efficiency.

Figure 6:

FIG. 6 depicts another example of a data structure 600 for a component of the BAS 2. In this example, the component is a latch of a door that may be a member of an access control system (e.g., access control system 20) of the BAS 2. As can be seen, the data structure 600 includes a Natural Frequency Rate Tag 602. In this example, the Natural Frequency Rate Tag 602 is set at every second. That is, the state of the door latch (i.e., the characteristic data) is reported/exported to the models layer 434 every second. However, in some cases, the modules of the models layer 434 may require that the state of the door latch be reported at a rate other than every second. For example, the Component Energy Forecasting Module 436 may require that the state of the door latch is reported every minute, the Component Deterioration Forecasting Module 438 may require that the state of the door latch is reported every 10 minutes, the Building Prediction Module 440 may require that the state of the door latch is reported every hour, and the Time to Event Prediction Module 442 may require that the state of the door latch is reported ever millisecond. In this case, one module requires that the state of the door latch is reported at minimum frequency that is less than the 1 second rate and three modules require that the state of the door latch is reported at minimum frequency that is greater than the 1 second rate. Accordingly, in some instances, the models layer 434 may be configured to change the rate at which the state of the door latch is reported based on the minimum frequency for each module. As such, in this examples, the models layer 434 may instruct the BAS 2 to report the state of the door latch every minute for the Component Energy Forecasting Module 436, every 10 minutes for the Component Deterioration Forecasting Module 438, every hour for the Building Prediction Module 440, and every millisecond for the Time to Event Prediction Module 442.

It should be understood that these are just a couple of examples of how the Natural Frequency Rate Tags 502 and 602 may be changed to adhere to the minimum frequency required by the models layer 434, including the Component Energy Forecasting Module 436, the Component Deterioration Forecasting Module 438, the Building Prediction Module 440, and the Time to Event Prediction Module 442, and any other application now known or created in the future. Moreover, in some cases, the Natural Frequency Rate Tags 502 and 602 may be set to more or less frequencies depending on the requirements of the application or the system in which the application is implemented.

Turning back to FIG. 4, in some cases, once the rate at which the characteristic data is configured for the modules to operate correctly, the models layer 434 may standardized the characteristic data based on a detailed history of energy monitoring, plus information about the systems of the BAS 2, demographics, and historical and real-time environmental conditions of the zones. The models layer 434 may then use multiple methods, such as pattern recognition, or any other suitable method to generate asset models for the components. Accordingly, the asset models may then be used to create and generate operation models for the components of the BAS 2. In some cases, the operation models may be forecasters of when the components are likely to malfunction or decrease in operation. As such, the models layer 434 may send a report of the predictive operation performance of the components to a technician/control operator for the BAS 2 and the agencies 402, such as a building automation sales group 444 and a building automation repair company 446 or remote device(s) (e.g., a field device, a smart phone, tablet computer, laptop computer, personal computer, PDA, and/or the like) owned by the technician or agencies 402. This may allow the technician and/or the agencies 402 to determine a proper course of action to take regarding the BAS 2 (e.g., repair the components, replace the components, and/or offer to repair or replace the components).

In some instances, the agencies 402 or another source of commercial real estate databases may provide real estate data 432 to the cloud computing environment 404. In some examples, the real estate data 432 may include existing pricing/value models of existing applications and other business intelligence (e.g., conversions and margins for previous projects related to building automation systems as defined by granular real estate data). In some examples, the modules of the models layer 434 may use the real estate data to update the set of asset models and generate new operation models for the components of the BAS 2. In other words, the real estate data 432 may help purge, standardize, tag, categorize, and summarize the characteristic data properly so that the characteristic data may be used to generate operation models that more accurately predict whether there is a likelihood that components are likely to malfunction or decrease in operation. Accordingly, in some cases, the models layer 434 may produce reliable, repeatable descriptive results and predictions and uncover "hidden insights" through historical relationships and trends in the characteristic data. As such, in some examples, the models layer 434 may be configured to "learn" from the trends and progressively improve the failure prediction of the operation models, without being explicitly programmed. For instance, the models layer 434 may automatically update the operation models for the components of the BAS 2 and produce a more accurate forecaster of when the components are likely to malfunction or decrease in operation and automatically identify sales opportunities and provide price/quote estimations that may then be reported to the technician and/or the agencies 402.

Figure 7A:
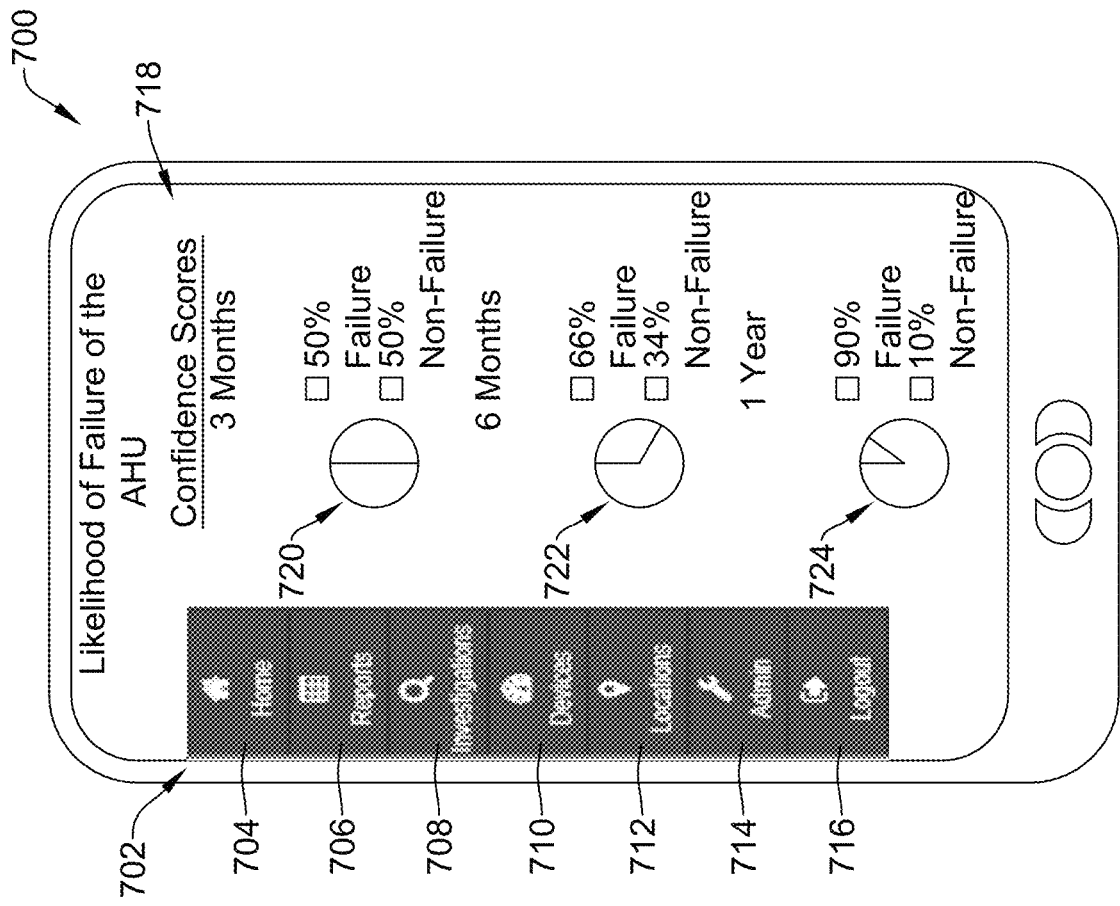
FIGS. 7A-7B depict an illustrative fault detection and prediction dashboard.

In some instances, the device 212, from FIG. 2, and/or the cloud computing environment, from FIG. 4, may generate reports in the form of an FDP Dashboard that gives a detailed account and predictions of the likelihood that a component of BAS may stop/fail or decrease in operational capacity and automatically identify sales opportunities and provide price/quote estimations to a technician/employee and/or an agency that repairs or replaces components of a BAS. FIG. 7A depicts an illustrative FDP Dashboard 700 generated by the on a display of a device, such as the remote device(s) 214, from FIG. 2. In some cases, the remote device 214 may be a smart phone, tablet computer, laptop computer, personal computer, PDA, a field device and/or the like used by a technician or employee of a building and/or an agency (e.g., the agencies 402, from FIG. 4). According to various embodiments, the FDP Dashboard 700 may be an integrated, simple to use dashboard. In some cases, the FDP Dashboard 700 may send notifications, alerts, provide confidence scores, geographical maps, charts, notes, investigation summaries, etc., regarding the likelihood that a component may stop/fail or decrease in operational capacity and/or costs/estimates for repairing or replacing the component. In some instances, the FDP Dashboard 700 may be configured with user accounts that need user passwords to navigate through templates/screens of the FDP Dashboard 700. In some examples, the FDP Dashboard 700 may configure the screens displayed based on the user/user account. For instance, the screens for a technician of a BAS may be configured to show the likelihood that a particular component of the BAS may decrease in operational capacity and a map showing the locations of agencies that repair or replace that particular component. The screens for agencies, on the other hand, may be configured to show the locations of buildings that have or may benefit from a particular component that the agency sells or repairs. Moreover, the screens for the agencies may also indicate which buildings have components that are likely to need repairing or replacing relatively soon. These are just a couple of examples of how the FDP Dashboard 700 can selectively configure the screens and is not intended to limit the scope of the disclosure. As such, the FDP Dashboard 700 can selectively configure the screens in any manner and as needed.

As shown in FIG. 7A, icons may be located on a sidebar 702 of the FDP Dashboard 700. The icons may include a home icon 704, a reports icon 706, an investigations icon 708, a components or devices icon 710, a locations icon 712, an administration icon 714, and a logout icon 716, for example. Each icon may be selected to display their corresponding template/screen of the FDP Dashboard 700. In this example, as shown in FIG. 4, the components icon 710 has been selected to display a components screen 718 showing a likelihood that an AHU may stop/fail or decrease in operational capacity. In some cases, the components screen 718 may provide confidence scores of whether there is a likelihood that the AHU may stop/fail or decrease in operational capacity. For example, as shown, the confidence score may be shown using a chart(s) 720, 722, and 724 that include a score or percentage of the likelihood that the AHU may fail at a given time. For instance, as shown by chart 720, the AHU has a likelihood of failure of 50% and a likelihood of non-failure of 50% in 3 months. As shown by chart 722, the AHU has a likelihood of failure of 66% and a likelihood of non-failure of 34% in 6 months. As shown by chart 724, the AHU has a likelihood of failure of 90% and a likelihood of non-failure of 10% in a year. It should be understood that such features of the components screen 718 are intended to be illustrative only and the components screen 718 may be configured in any manner and include any number of depictions of the confidence scores such as icons, bar graphs, scatter plots, thumbnails, etc. Moreover, the components screen 718 may also include any number of features, such as icons, sidebars, scroll bars, etc.

Figure 7B:
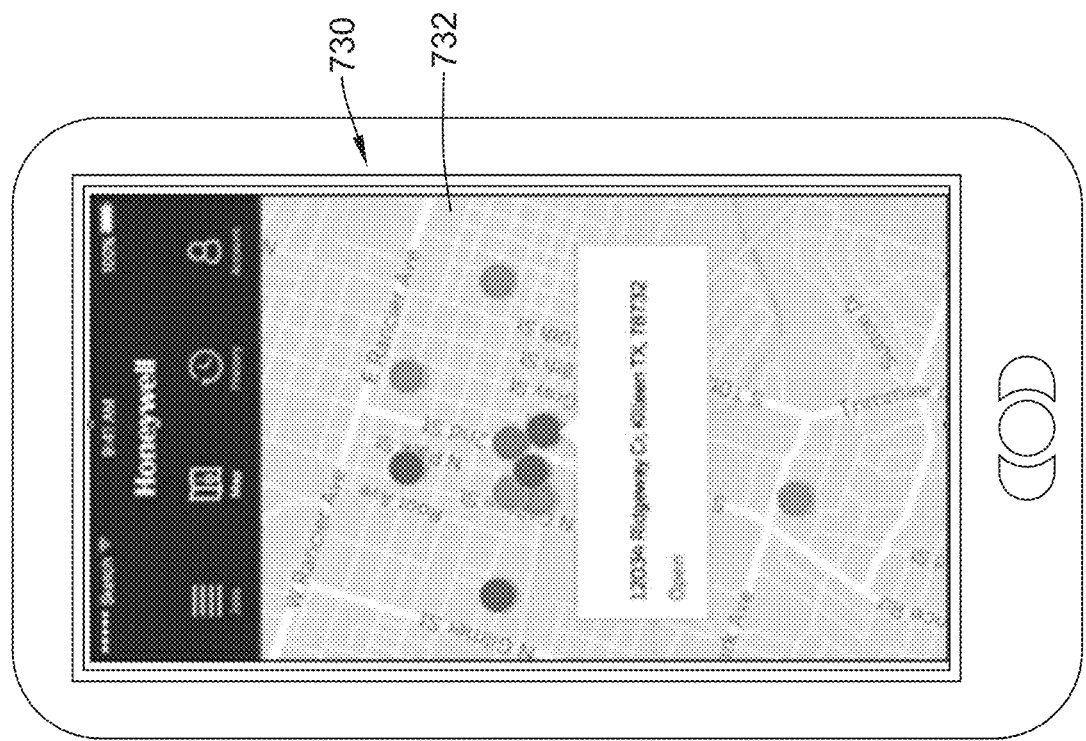

Turning to FIG. 7B, in this example, the FDP Dashboard 700 may generate a locations screen 730 when the locations icon 712 (shown in FIG. 7A) is selected. In some cases, the locations screen 730 may display detailed map 732 of a particular neighborhood configured specifically for a technician of a BAS of a building located in or near that particular neighborhood. As shown, the map 732 may include indicators that highlight how many agencies that repair or replace AHUs exist in the neighborhood and the addresses of those agencies. In some examples, the indicators may have a visual indication of how well regarded a particular agency is and an estimate of how much it may cost each agency to repair or replace the AHU. It should be understood that such features of the locations screen 730 are intended to be illustrative only and the locations screen 730 may be configured in any manner and include any number of depictions of the detailed map 732. Moreover, the locations screen 730 may also include any number of features, such as icons, sidebars, scroll bars, graphs, thumbnails, etc.

Figure 8:
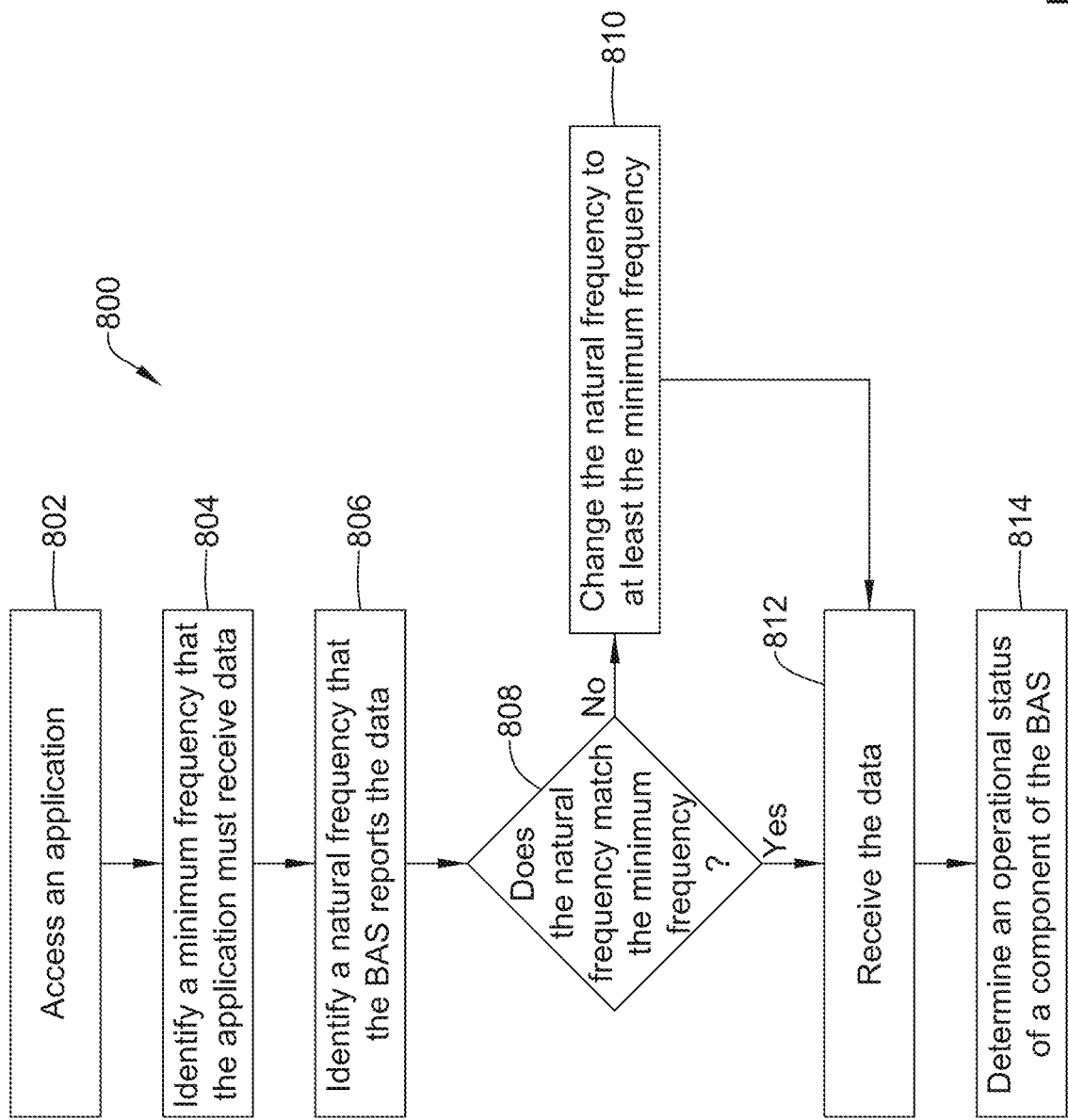
FIG. 8 is an illustrative method.

FIG. 8 depicts an illustrative method 800 for monitoring a BAS. The method 800 begins at step 802, where an application is accessed from memory operatively coupled to the BAS. At step 804, a minimum frequency that the application requires that data must be received is identified. At step 806, a natural frequency that the BAS reports the data is identified. At step 808, it is determined whether the natural frequency that the BAS reports the data matches the minimum frequency that the application must receive the data. If the natural frequency does match the minimum frequency, at step 812, the data from the BAS is received at least at the minimum frequency. However, if the natural frequency does not match the minimum frequency, at step 810, the natural frequency is changed to at least the minimum frequency and then, at step 812, the data from the BAS is received at least at the minimum frequency. At step 814, the operational status of a component of the BAS is then determined using the application and the received data.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code may include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Also, in the above Description, various features may be grouped together to streamline the disclosure. This should not be interpreted as intending that an unclaimed disclosed feature is essential to any claim. Rather, system subject matter may lie in less than all features of a particular disclosed embodiment. Thus, the following claims are hereby incorporated into the Description as examples or embodiments, with each claim standing on its own as a separate embodiment, and it is contemplated that such embodiments can be combined with each other in various combinations or permutations. The scope of the system should be determined with reference to the appended claims, along with the full scope of equivalents to which such claims are entitled.

What is claimed is:

1. A system configured to monitor a building automation system (BAS) for a building, wherein the system comprises:
 a device with a controller, wherein the controller is communicatively coupled to the building automation system (BAS), and wherein the controller is configured to:
  receive, from at least one of a plurality of electronic components of the building, characteristic data at a first frequency, wherein the first frequency is indicative of a pre-configured frequency at which the at least one of the plurality of electronic components is configured to report the characteristic data to the device; and
 a cloud computing environment communicatively coupled to the device, wherein the cloud computing environment comprises a plurality of modules, and wherein the cloud computing environment is configured to:
  receive the characteristic data at the first frequency from the device;
  compare the first frequency with each of a plurality of minimum frequencies associated with each module of the plurality of modules, wherein the plurality of minimum frequencies are pre-defined based on a variable to be monitored in the building;
  in response to the comparison and determining that the first frequency is different from each of the plurality of minimum frequencies, evaluate a second frequency based on the characteristic data and the plurality of minimum frequencies, wherein the second frequency is different from the first frequency and corresponds to a frequency at which the plurality of modules in the cloud computing environment requires the characteristic data to generate one or more operational models for the plurality of electronic components;
  receive the characteristic data from the device at the second frequency;
  perform at least one of data tracking, data validation, data processing, and data recording with the characteristic data;
  generate the one or more operational models for the plurality of electronic components based on the characteristic data received at the second frequency and at least one of the data tracking, the data validation, the data processing, and the data recording with the characteristic data;
  generate one or more insights for the at least one of the plurality of electronic components by the one or more operational models;
  predict, based on the one or more insights, one or more operating and structural limitations causing the at least one of the plurality of electronic components to fail at a time frame;
  transmit the one or more insights including predicted one or more operating and structural limitations corresponding to the at least one of the plurality of electronic components as a report to the building automation system (BAS);
  automatically update the one or more operational models for the plurality of electronic components based on the transmitted one or more insights as the report;
  identify, based on the report, at least one corrective action associated with the at least one of the plurality of electronic components; and
  control, based on the at least one corrective action, display of a map indicating a list of agencies in vicinity of a location of the BAS; and
  transmit the at least one corrective action to at least one agency from the list of agencies.

2. The system of claim 1, wherein the controller is further configured to:
 identify the at least one agency that can repair or replace the at least one of the plurality of electronic components of the BAS; and
 send information associated with the at least one agency and an estimated cost for repairing or replacing the at least one of the plurality of electronic components to a technician associated with the BAS.

3. The system of claim 1, wherein the plurality of modules comprises at least one of: a Component Energy Forecasting Module, a Component Deterioration Forecasting Module, a Building Prediction Module, and a time to event prediction module, and wherein at least one module of the plurality of modules requires the characteristic data to be reported at the second frequency to generate the one or more insights.

4. The system of claim 3, wherein the Component Energy Forecasting Module requires the characteristic data to be reported at the second frequency to forecast energy of the at least one of the plurality of electronic components of the building.

5. The system of claim 3, wherein the Component Deterioration Forecasting Module requires the characteristic data to be reported at the second frequency to forecast deterioration or constraints of the at least one of the plurality of electronic components of the building.

6. The system of claim 3, wherein the Building Prediction Module requires the characteristic data to be reported at the second frequency to predict the operating and structural limitations of the at least one of the plurality of electronic components that causes the at least one of the plurality of electronic components to fail.

7. The system of claim 3, wherein the time to event prediction module requires the characteristic data to be reported at the second frequency to predict a time period until failure of the at least one of the plurality of electronic components occur.

8. The system of claim 1, wherein the one or more operational models are configured to determine an operational status of the plurality of electronic components, wherein the operational status indicates that the at least one of the plurality of electronic components needs repair or replacement.

9. The system of claim 1, wherein the characteristic data is at least one of: heating, ventilation, and air conditioning (HVAC) system data, security system data, lighting system data, fire system data, access control system data, status data, calculated data, set point data, identification data, weather data, sensor data, and image data associated with the at least one of the plurality of electronic components of the building.

10. The system of claim 1, wherein the one or more insights transmitted as the report is rendered as a Fault Detection and Prediction Application (FDP) dashboard on a display of a mobile device associated with an employee of the building, wherein the FDP dashboard provides at least one of: an account and one or more predictions indicating that the at least one of the plurality of electronic components of BAS fails in operational capacity.

11. The system of claim 1, wherein the variable to be monitored in the building is associated with at least one of: a heating, ventilation, and air conditioning (HVAC) system, a security system, a lighting system, a fire system, and an access control system, and wherein the variable is at least one of: temperature, current, and humidity in at least one zone of the building.

12. The system of claim 1, wherein the at least one corrective action includes identification of a sales opportunity and transmission of an estimated cost to the at least one agency.

13. A cloud computing network with a plurality of modules configured to monitor a building automation system (BAS), the cloud computing network comprises:
at least one processor coupled to a memory, wherein the processor is configured to:
receive characteristic data of at least one of a plurality of electronic components of the BAS at a first frequency, wherein the first frequency is indicative of a pre-configured frequency at which the at least one of the plurality of electronic components is configured to report the characteristic data to cloud computing network;
compare the first frequency with each of a plurality of minimum frequencies associated with each module of the plurality of modules, wherein the plurality of minimum frequencies are pre-defined based on a variable to be monitored in the building;
in response to the comparison and determining that the first frequency is different from each of the plurality of minimum frequencies, evaluate a second frequency based on the characteristic data and the plurality of minimum frequencies, wherein the second frequency is different from the first frequency and corresponds to a frequency at which the plurality of modules in the cloud computing network requires the characteristic data to generate one or more operational models for the plurality of electronic components;
receive the characteristic data at the second frequency;
perform at least one of data tracking, data validation, data processing, and data recording with the characteristic data;
generate the one or more operational models for the plurality of electronic components based on the characteristic data received at the second frequency and at least one of the data tracking, the data validation, the data processing, and the data recording with the characteristic data;
generate one or more insights for the at least one of the plurality of electronic components by the one or more operational models;
predict, based on the one or more insights, one or more operating and structural limitations causing the at least one of the plurality of electronic components to fail at a time frame;
transmit the one or more insights including predicted one or more operating and structural limitations corresponding to the at least one of the plurality of electronic components as a report to the building automation system (BAS);
automatically update the one or more operational models for the plurality of electronic components based on the transmitted one or more insights as the report;
identify, based on the report, at least one corrective action associated with the at least one of the plurality of electronic components;
control, based on the at least one corrective action, display of a map indicating a list of agencies in vicinity of a location of the BAS; and
transmit the at least one corrective action to at least one agency from the list of agencies.

14. The cloud computing network of claim 13, wherein the one or more operational models are configured to determine an operational status of the plurality of electronic components of the BAS, wherein the operational status indicates that the at least one of the plurality of electronic components of the BAS needs repair.

15. The cloud computing network of claim 13, wherein the processor is further configured to:
identify the at least one agency that can repair or replace the at least one of the plurality of electronic components; and
send information associated with the at least one agency and an estimated cost for repairing or replacing the at least one of the plurality of electronic components to a technician associated with the BAS.

16. The cloud computing network of claim 13, wherein the characteristic data is at least one of: heating, ventilation, and air conditioning (HVAC) system data, security system data, lighting system data, fire system data, access control system data, status data, calculated data, set point data, identification data, weather data, sensor data, and image data associated with the at least one of the plurality of electronic components of the building.

17. The cloud computing network of claim 13, wherein the variable to be monitored in the building is associated with at least one of: a heating, ventilation, and air conditioning (HVAC) system, a security system, a lighting system, a fire system, and an access control system, and wherein the variable is at least one of: temperature, current, and humidity in at least one zone of the building.

18. A non-transitory computer readable medium containing instructions that when executed cause at least one processor to:
send characteristic data of at least one of a plurality of electronic components of a building automation system (BAS) at a first frequency, wherein the first frequency is indicative of a pre-configured frequency at which the at least one of the plurality of electronic components is configured to report the characteristic data to a cloud computing network;
receive an indication from the cloud computing network that the characteristic data of the at least one of the plurality of electronic components is to be sent at a second frequency different from the first frequency, wherein the second frequency is a frequency at which the cloud computing network requires the characteristic data to generate one or more operational models for the plurality of electronic components, wherein the second frequency is evaluated by the cloud computing network based on:
    comparing the first frequency with each of a plurality of minimum frequencies associated with each module of a plurality of modules in the cloud computing environment, wherein the plurality of minimum frequencies are pre-defined based on a variable to be monitored in the building; and
    in response to the comparison and determining that the first frequency is different from each of the plurality of minimum frequencies, evaluate the second frequency based on the characteristic data and the plurality of minimum frequencies, wherein the second frequency is different from the first frequency and corresponds to a frequency at which the plurality of modules in the cloud computing environment requires the characteristic data to generate one or more operational models for the plurality of electronic components;
send the characteristic data at the second frequency to the cloud computing network, wherein the cloud computing network is configured to:
    perform at least one of data tracking, data validation, data processing, and data recording with the characteristic data; and
    generate the one or more operational models for the plurality of electronic components based on the characteristic data received at the second frequency and at least one of the data tracking, the data validation, the data processing, and the data recording with the characteristic data; and
    receive one or more insights as a report from the cloud computing network, wherein the one or more insights are related to a prediction of one or more operating and structural limitations causing the at least one of the plurality of electronic components to fail at a time frame, wherein the one or more insights are generated by the one or more operational models of the cloud computing network, wherein the one or more operational models for the plurality of electronic components are automatically updated based on the received one or more insights as the report, wherein at least one corrective action associated with the at least one of the plurality of electronic components is identified based on the report; wherein a map indicating a list of agencies in vicinity of a location of the BAS is displayed based on the at least one corrective action, and wherein at least one corrective action is transmitted to at least one agency from the list of agencies.

19. The non-transitory computer readable medium of claim 18, wherein the one or more insights transmitted as the report is rendered as a Fault Detection and Prediction Application (FDP) dashboard on a display of a mobile device associated with an employee of the building, wherein the FDP dashboard provides at least one of: an account and one or more predictions indicating that the at least one of the plurality of electronic components of BAS fails in operational capacity.

20. The non-transitory computer readable medium of claim 18, wherein the characteristic data is at least one of: heating, ventilation, and air conditioning (HVAC) system data, security system data, lighting system data, fire system data, access control system data, status data, calculated data, set point data, identification data, weather data, sensor data, and image data associated with the at least one of the plurality of electronic components of the building.

* * * * *